USOO6859524B2

(12) United States Patent
Unger et al.

(10) Patent No.: US 6,859,524 B2
(45) Date of Patent: *Feb. 22, 2005

(54) SYSTEM AND METHOD FOR AUTOMATED THIRD PARTY VERIFICATION

(75) Inventors: Nicholas K. Unger, Vienna, VA (US); Timothy M. Price, Rockville, MD (US); John R. Ramsay, Herndon, VA (US); Dana N. Skaddan, Fairfax Station, VA (US)

(73) Assignee: Convergys Customer Management Group, Inc, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/463,557

(22) Filed: Jun. 17, 2003

(65) Prior Publication Data

US 2003/0219105 A1 Nov. 27, 2003

Related U.S. Application Data

(63) Continuation of application No. 09/176,929, filed on Oct. 23, 1998, now Pat. No. 6,650,736.

(51) Int. Cl.[7] .............................................. H04M 11/00
(52) U.S. Cl. ................................ 379/88.16; 379/88.18; 379/88.01; 379/92.01; 704/273
(58) Field of Search ................................. 379/88.02, 85, 379/92.01, 900, 88.16; 713/200; 704/273

(56) References Cited

U.S. PATENT DOCUMENTS

| 4,747,125 | A | | 5/1988 | Buchberger et al. | .......... 379/67 |
|---|---|---|---|---|---|
| 5,136,633 | A | | 8/1992 | Tejada et al. | ................. 379/91 |
| 5,181,238 | A | | 1/1993 | Medamana et al. | ........... 379/95 |
| 5,185,781 | A | | 2/1993 | Dowden et al. | ............... 379/67 |
| 5,325,421 | A | | 6/1994 | Hou et al. | ...................... 379/67 |
| 5,329,589 | A | | 7/1994 | Fraser et al. | ................... 379/91 |
| 5,396,542 | A | | 3/1995 | Alger et al. | ................... 379/67 |
| 5,465,290 | A | | 11/1995 | Hampton et al. | ............. 379/67 |
| 5,485,510 | A | | 1/1996 | Colbert | ....................... 379/145 |
| 5,608,784 | A | | 3/1997 | Miller | ........................... 379/88 |
| 5,633,910 | A | | 5/1997 | Cohen | .......................... 379/38 |
| 5,655,007 | A | | 8/1997 | McAllister | ............... 379/91.01 |
| 5,715,298 | A | | 2/1998 | Rogers | .................... 379/91.01 |
| 5,819,029 | A | * | 10/1998 | Edwards et al. | ............ 713/200 |
| 5,938,772 | A | * | 8/1999 | Welch | ......................... 713/320 |
| 6,650,736 | B1 | * | 11/2003 | Unger et al. | .............. 379/88.02 |

* cited by examiner

*Primary Examiner*—Fan Tsang
*Assistant Examiner*—Simon Sing
(74) *Attorney, Agent, or Firm*—Frost Brown Todd LLC

(57) ABSTRACT

A system and method for performing independent third party verification utilizes an automated system for posing questions to a customer and for recording and analyzing the customer's responses to those questions. The system could include a voice synthesizer or an audio player for posing oral questions to a customer. The system could also include voice recognition capabilities to analyze a customer's oral responses to questions. The system could also be provided with the capability to analyze a series of customer responses and to create an automated score to confirm or deny the verification process. The system could further include a live operator interface to allow a live operator to quickly review only the customer's responses to a series of verification questions. The live operator's analysis of the customer responses could be compared to the automated analysis as a further check on the verification process. Preferred embodiments would also include the means to access customer responses based on customer-specific information.

25 Claims, 3 Drawing Sheets

SYSTEM AND METHOD FOR AUTOMATED THIRD PARTY VERIFICATION

PRIORITY STATEMENT

This is a continuation application which claims priority from the earlier filed non-provisional application Ser. No. 09/176,929 filed Oct. 23, 1998 now U.S. Pat. No. 6,650,736.

BACKGROUND OF THE INVENTION

1. Field of the Invention

The invention relates to third party verification services. Such services can be used, among other things, to confirm a customer's intent to buy a product or service.

2. Background of the Related Art

There are many instances when a vendor of goods and services must obtain independent third party verification of a customer's intent to purchase goods and services, and/or that the customer is empowered to enter into the transaction. One common example is where a customer agrees to switch from one long distance telephone service provider to another. Under current FCC regulations, a long distance telephone service provider who convinces a customer to switch must obtain proof that the customer is authorized to make the switch, and that the customer desires the switch. One common way of obtaining this proof is to obtain independent third party verification of the customer's intent and authorization to make the switch.

Currently, several companies provide the independent third party verification service to the seller's of goods and services. Typically, the independent verification service provider will employ many live telephone operators who perform the verification process. A description of how a typical independent verification process works, in connection with a switch of long distance telephone service providers, is provided below.

To begin, a sales agent of a long distance telephone service provider will call a customer who is currently using a different long distance service provider, and the sales agent will attempt to convince the customer to switch service providers. If the sales agent is successful, the sales agent will then pass the customer off to a live operator at the independent third party verification service. In some instances, the sales agent may provide the live operator at the independent verification service with some customer-specific information, such as the customer's telephone number, name, address and social security number. The sales agent will then terminate his connection with the customer and with the independent verification service.

The live operator at the independent verification service will then ask the customer a series of questions to verify that the customer desires to make the switch to a new service provider, that the customer is empowered to make the switch, and in some instances, to verify that the customer understands the terms of the new service agreement. The customer's oral responses to the operator's questions are recorded to provide proof that the customer authorized the switch to the new telephone service provider.

The independent third party verification service is relatively expensive for the telephone service providers. The high cost of the independent verification service is due to the need to pay a significant number of live operators to perform the service, thus ensuring that enough live operators are standing by to handle all the verification needs for the sales agents.

SUMMARY OF THE INVENTION

It is an object of the present invention to provide an independent third party verification service which is less expensive than a system using live operators for customer interaction.

It is also an object of the present invention to provide a system and method which achieves a high degree of accuracy in performing the independent verification process.

It is a further object of the present invention to provide automated remote access to recorded customer responses.

In a system and method embodying the present invention, after a sales agent sells goods or services to a customer, the sales agent will engage an automated independent verification service. The automated system is used to pose one or more questions to a customer, and to automatically record the customer's responses to those questions. The automated system can use a voice synthesizer or pre-recorded sounds to create appropriate questions. The customer's responses can be oral responses, and voice recognition software can be used to analyze and interpret the oral responses. During or after the customer questioning process, the system can create an automated score of customer responses which provides an indication of whether the customer has agreed to purchase the goods and services, and possibly whether the customer is authorized to enter into the transaction.

With an automated system embodying the present invention, a large number of automated customer verification calls can be conducted without the need for live operator intervention. If it is desirable, to increase the accuracy of the verification process, the recorded customer responses can be reviewed by a live operator to verify that the automated score (indicating the customer's intent and authorization) is accurate.

Because the customer interaction is completely automated, the live operator can conduct a review of customer responses at any time. A large number of customer responses can be stored in a memory device of the system, and all the responses can be reviewed at one time to maximize the effectiveness of the live operator's review time. Also, because the live operator need only review the customer responses to the questions posed by the system, and not the questions, the amount of time required for the live operator to review customer responses is minimized.

After reviewing each series of customer responses, the live operator can generate an operator score, which is also indicative of the customer's intent and/or authorization to purchase goods and services. The system could then automatically compare the operator's score to the automated score as a second check of the automated score. This serves to increase the accuracy of the verification process.

Because a live operator need only review the customer responses to questions posed by the automated system, and because there is no dead time between verification calls, the amount of live operator time required to perform the verification process is greatly reduced compared to prior art independent verification services. This helps to reduce the cost of the independent verification service. In addition, because the operator's score of the customer responses can be compared to an automated score created by the system, the accuracy of the independent verification process is increased.

Additional advantages, objects, and features of the invention will be set forth in part in the description which follows and in part will become apparent to those having ordinary skill in the art upon examination of the following, or may be learned from practice of the invention. The objects and advantages of the invention may be realized and attained as particularly pointed out in the appended claims.

BRIEF DESCRIPTION OF THE DRAWINGS

A detailed description of a system and method embodying the invention will be provided in conjunction with the following drawing figures, wherein like reference numerals refer to like elements, and wherein.

DETAILED DESCRIPTION OF PREFERRED EMBODIMENTS

Figure 1:
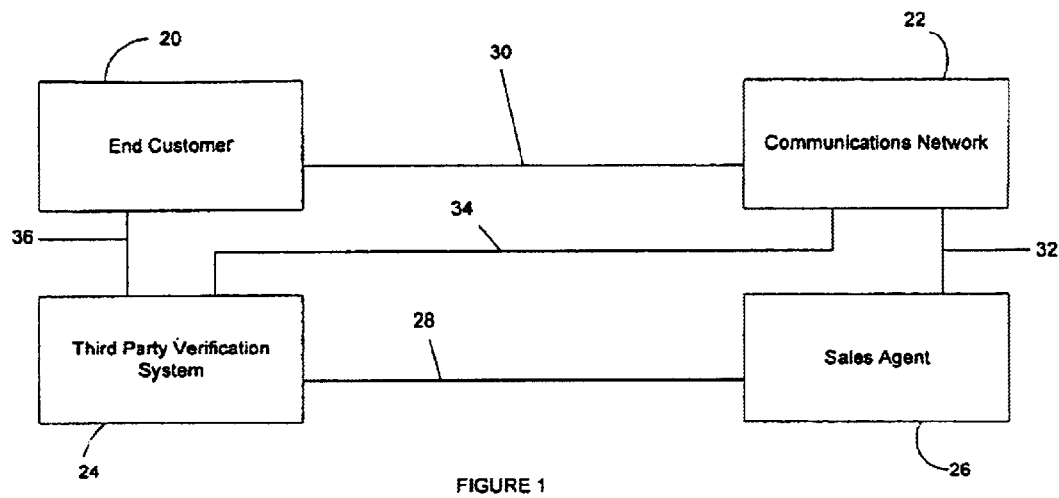
FIG. 1 is a block diagram showing the relationships between a sales agent, a customer and an independent verification service.

As shown in FIG. 1, the end customer 20 is typically connected to a sales agent 26 through a communications network 22. The communications network could be a telephone system, a computer network, a worldwide computer network such as the internet, or a radio communications system. Thus, the communications network 22 may enable communications between the end customer 20 and the sales agent 26 via telephone lines, computer data lines, or radio frequency transmissions.

An independent third party verification system 24 could also be connected to the end customer 20 and the sales agent 26 through the communications network 22. A telephone line, computer data link, or radio frequency transmissions would also connect the third party verification system 24 to the communications network 22. Alternatively, the independent third party verification system 24 could be connected to the end customer 20, and/or the sales agent 26 via separate data connection lines 36 and 28, respectively.

In the system shown in FIG. 1, a sales agent would first communicate with the end customer to attempt to convince the customer to purchase goods or services. If the sales agent is successful, the sales agent could then engage the third party verification system 24 so that the sales agent 26, the end customer 20 and the third party verification system 24 can all communicate with one another simultaneously. After the sales agent 26 has introduced the third party verification system 24, the sales agent would be disconnected, so that only the end customer 20 is in communication with the third party verification system 24. The third party verification system would then conduct an automated interrogation of the customer, and the customer's responses to questions would be recorded and analyzed by the third party verification system 24.

Figure 2:
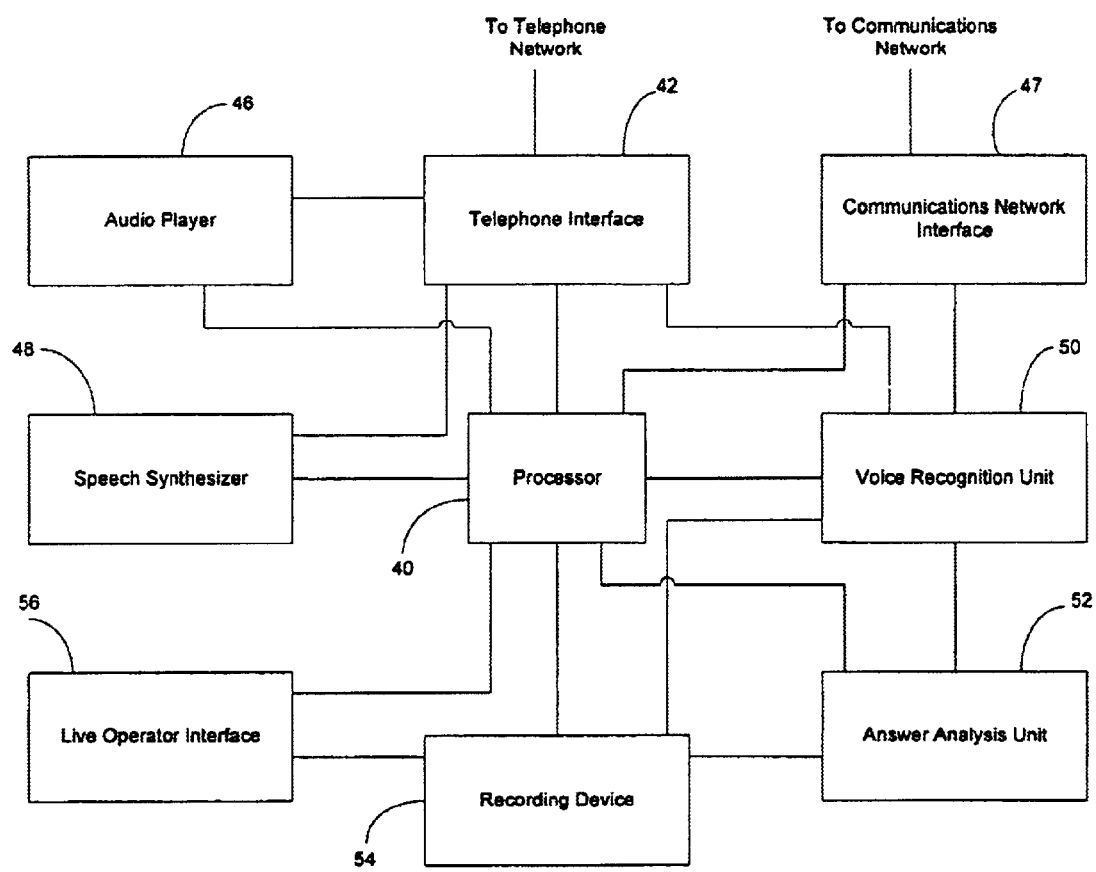
FIG. 2 is a block diagram of an automated independent verification system embodying the invention.

A block diagram of a system embodying the invention is shown in FIG. 2. In this system, a processor 40 communicates with and coordinates the actions of the other elements of the system. The system could include a telephone interface 42 and/or a communications network interface 44. The telephone interface 42 would be used to communicate with a typical telephone system, and would enable the processor to initiate, control and terminate telephone calls. The communications network interface 44 could be used to communicate with sales agents or customers via any other type of communications medium, such as local area computer networks (LANs), wide area computer network (WANs), global computer networks such as the internet, or any type of radio communications system.

The system could also include a speech synthesizer 48 and/or an audio player 46. Either the speech synthesizer 48 or the audio player 46 would be used to generate and/or play questions to be posed to a customer. The audio player 46 or speech synthesizer 48 could also be used to generate questions posed to a sales agent that are designed to elicit customer-specific information which can be used in an independent verification process.

The system could also include a voice recognition unit 50 that is capable of analyzing and interpreting oral responses given by a customer. The voice recognition unit 50 could also be used to analyze and interpret oral responses given by a sales agent that communicate customer-specific information to the system. The voice recognition unit 50 could also include an answer analysis unit, or a separate answer analysis unit 52 could be linked to the voice recognition unit 50. The answer analysis unit 52 would analyze customer responses, or responses from a sales agent. In the case of customer responses, the answer analysis unit 52 could create an automated score indicative of a customer's intent and/or authorization to purchase goods and services.

If a customer responds to questions by pressing buttons on a telephone keypad, the answer analysis unit 52 and/or the the processor 40 could be configured to interpret the dual tone multiple frequency (DTMF) sounds generated by the customer's telephone so that the system knows how the customer is responding.

If a customer responds to questions by inputting data or making a selection using a graphical pointing device of the customer's computer, the system would be configured to interpret computer data transmitted to the verification system from the customer's computer.

The system would include a recording device 54 for recording customer-specific information, customer responses to questions, and possibly the questions posed to a customer. Any type of data recording device could be used for this purpose. Although magnetic and optical tapes and disks, and various types of semiconductor memory devices such as EEPROMs and flash memories could be used, the inventors anticipate that other storage mediums may be developed in the future. Such other storage mediums could also be used as the recording device 54 of a system embodying the invention.

The system could further include a live operator interface 56 which allows a live operator to review customer responses, sales agent responses, and possibly the questions posed to customers. The live operator interface could also include the capability to create and/or record a live operator score of a series of customer responses. The live operator score would also provide an indication of a customer's intent and/or authorization to purchase goods and services.

The processor could include the capability to compare automated scores of customer responses generated by the answer analysis unit 52 to live operator scores generated by the live operator using the live operator interface 56. This comparison would act as a check on the accuracy of the automated score created by the system, thereby increasing the accuracy of the independent verification process.

An independent verification method embodying the invention, that makes use of the system shown in FIG. 2, will now be described with reference to the flow charts of FIGS. 3 and 4.

Figure 3:
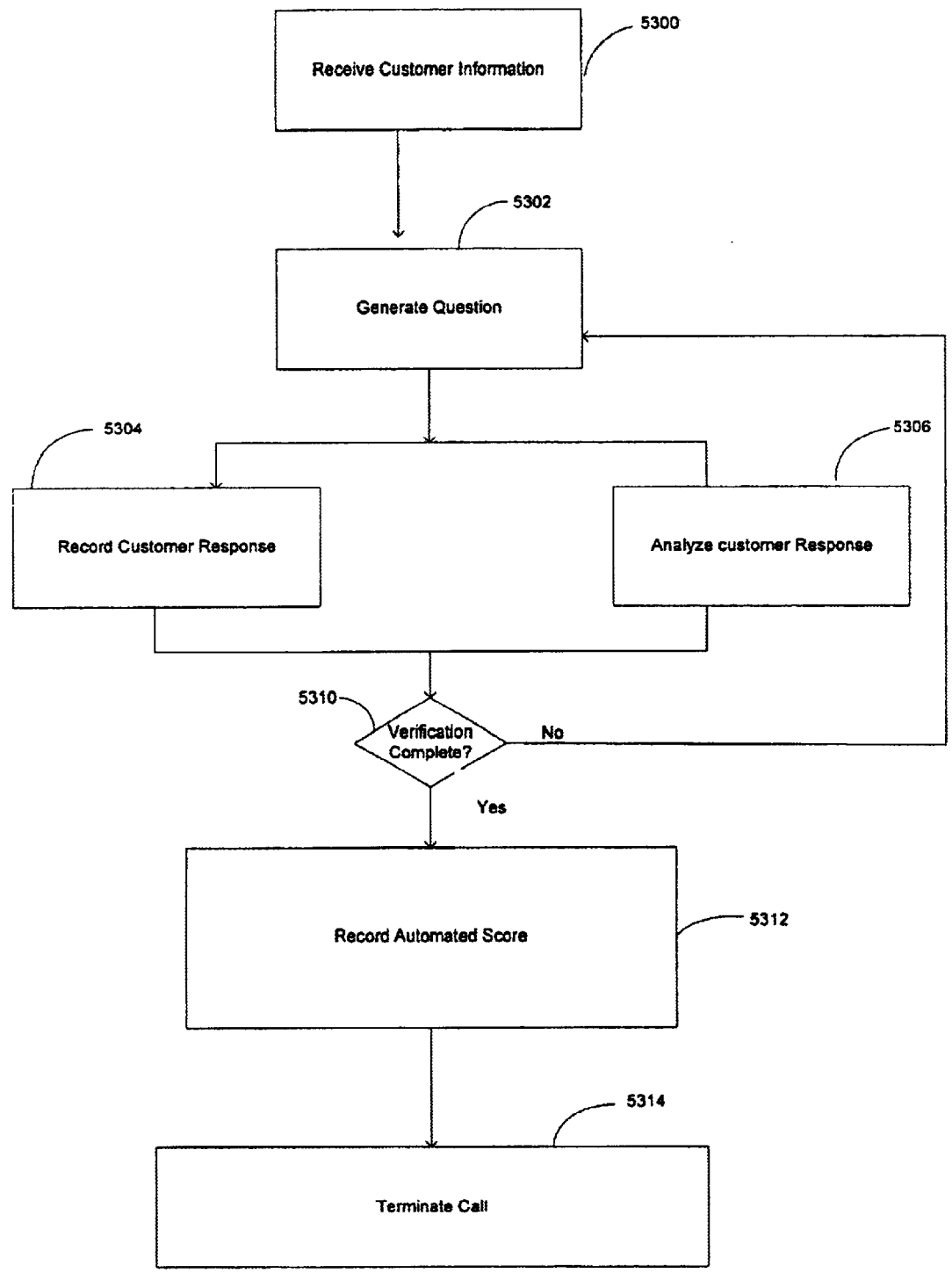
FIG. 3 is a flow chart showing steps of a method embodying the invention.

As shown in FIG. 3, at the beginning of an independent verification method, customer-specific information could be received by the system in step 300. This is an optional step whose presence will depend upon the verification process to be performed. In some instances, it may not be necessary to obtain customer-specific information prior to posing a series of questions to the customer. In other instances, it may be highly desirable to transfer some customer-specific information between a sales agent and the automated system. The customer-specific information could be used to determine what questions should be posed to a particular customer, or the customer-specific information could be incorporated into the questions posed to a customer. Also, the questions ultimately posed to a customer may be designed to elicit the same customer-specific information transferred from the sales agent. The system could then compare the information received from the sales agent to the information provided by the customer to ensure that there is a match.

The system would then generate at least one question and pose that question to the customer in step 302. If the system is utilizing a telephone interface with the customer, the system could use a speech synthesizer or audio player to generate an audible question which is posed to the customer. Alternatively, if the system is communicating with a customer via a computer terminal interface, using some type of data link, the questions may appear in the form of text and/or graphics that appear on the customer's computer screen. If the customer's computer is equipped with the appropriate sound reproduction and recording equipment, the computer interface could be used in the same manner as a telephone interface to pose audible, spoken questions, and to capture oral customer responses.

When the customer responds to the question, the customer response will be recorded by the system in step 304. Also, in step 306, the customer's response will be analyzed by the system. If the customer's response is oral, a speech recognition capability could be used to analyze the response. Alternatively, if the customer pushes a button on a telephone keypad as a response, the analysis step could include interpreting the DTMF sounds produced by the customer's telephone. In still other alternative embodiments, where the customer is interacting with the system via a computer terminal, the analysis step could include analyzing text sent from the user's computer, or analyzing signals from the customer's computer that indicate the position of a pointing device. In any event, in preferred embodiments of the system, the step of analyzing a customer response, and the step of recording the customer's response would be performed simultaneously.

After the customer's response has been recorded and analyzed, the system would determine whether the verification process is complete, or wherein additional questions should be posed in step 310. If the verification process is not complete, the method would return to step 302, and another question would be generated and posed to the customer. If the verification process is complete, the method would proceed from step 310 to step 312, where an automated score, based on the analyses of the customer responses, is recorded. The call would then be terminated in step 314.

Because the system analyzes customer responses to questions, and does not merely record the responses, the system can be programmed to interact with a customer in an intelligent fashion. For instance, if the system is expecting an affirmative response from a customer, and instead receives a negative response, the system could be programmed to pose the same question again to ensure that the customer understood the question and intended to respond in a negative fashion. Also, the system could be programmed with a complex series of questions, where the response to a first question guides what questions will then be posed to the customer. Further, at the end of the verification process, a question could be posed to determine if the customer would like to receive additional information or be connected to a live operator or sales agent. Depending on the customer response, the customer could then be provided with recorded information or connected to an appropriate source.

All the steps of the verification process described above can be performed by the system in an automated fashion without any need for live operator intervention. Thus, the entire call sequence between the system and the customer can proceed without the need for a live operator. Because the system is provided with the ability to analyze customer responses to questions, the system can make an initial automated determination about whether the customer has confirmed his intent and/or authorization to purchase goods and services. A live operator need only become involved if it is necessary or desirable to verify that the automated analysis performed by the system is correct. A live operator confirmation process will be described below in conjunction with the flow chart shown in FIG. 4.

Figure 4:
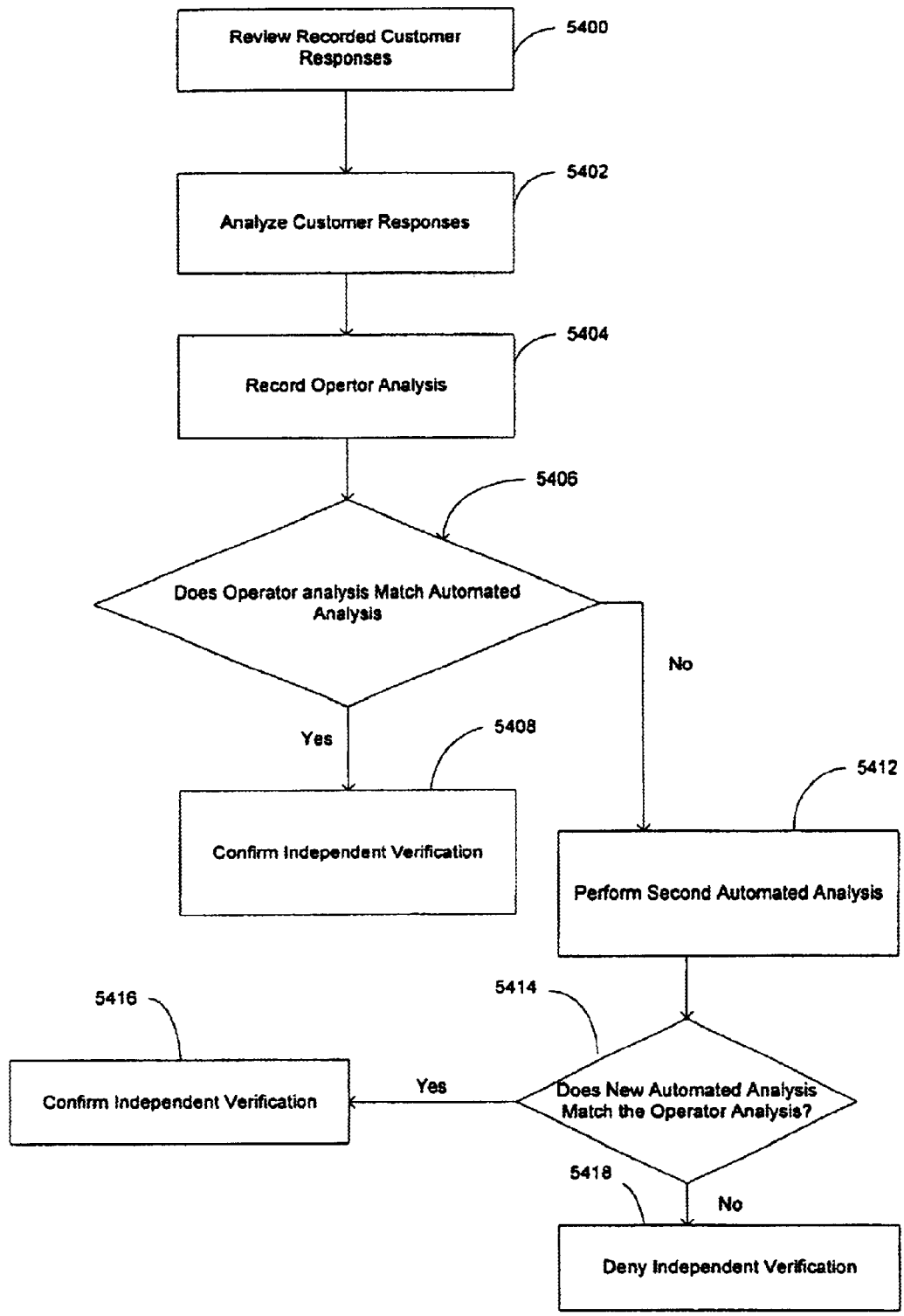
FIG. 4 is a flow chart showing steps of another method embodying the invention.

As shown in FIG. 4, in a first step 400, a live operator would review recorded customer responses to a series of questions. The live operator would analyze the customer responses in step 402 and would create and record an operator analysis of the customer's responses in step 404. The operator's analysis would be stored as an operator score.

The system could then compare the results of the operator's analysis to the results of the automated analysis previously performed by the system. If the operator's analysis of the customer's responses corresponds with the automated analysis, the independent verification would be confirmed in step 408. Thus, no further operator intervention would be required.

If the operator's analysis does not correspond with the automated analysis, the system could perform a second automated analysis in step 412. The system would then compare the results of the second automated analysis to the results of the operator's analysis in step 414. If the second automated analysis still does not match the operator's analysis, the system would deny the independent verification in step 418. The customer's responses could then be reviewed by a different live operator, or by a supervisor. If the results of the second automated analysis match the results of the live operator's analysis, the system would confirm the independent verification in step 416.

In alternative embodiments of systems and methods embodying the invention, where the customer is connected to the automated verification system via a computer terminal, the questions posed to the customer could take the form of text and graphics which are communicated to the customer's computer terminal in a digital format via a computer link. The text and graphics would actually pose the question to the customer, and the customer could respond to the question by either typing information using a terminal keypad or by pointing to and selecting various icons or graphical figures using a computer pointing device. The customer's responses would then be communicated back to the automated system via the computer link, and the computer could easily interpret the customer response.

Also, if a customer's computer terminal has the ability to play sounds and capture oral responses, the computer could be used in much the same way as a telephone to provide an audio/oral link between the customer and the automated verification system. This audio/oral link could be supplemented by text and graphics that appear on the customer's computer screen. The automated verification system would then perform the same voice analysis as is done in the telephone based system described above.

Also, an automated system could communicate with a sales agent in the same ways described above for the customer. This would allow the sales agent to input customer-specific information at his computer, and this information could be automatically transferred to the verification system when the sales agent passes a customer call off the verification system.

An independent verification system embodying the invention would record and archive at least the customer responses to questions posed to the customer. The customer responses could be stored in an analog audio format, or the responses could be digitized and stored in a digital format. In preferred embodiments of the verification system, the system would be configured to provide easy access to the recorded information so that the responses of a specific customer can be accessed and reviewed. This retrieval capability could be provided to third parties, such as the original sales agents, via a telephone or computer link to the automated system. This would allow the vendor of goods and services to verify that a particular customer agreed to purchase goods and services. The automated retrieval system could utilize customer-specific information to access a particular set of customer responses.

Also, the system could be configured to store both the questions posed to the customer, and the customer's responses. This would allow an entire call sequence to be replayed. In a system configured to record only the customer responses, an entire call sequence could be re-created by playing the questions posed to the customer, and then the customer's recorded responses.

Although portions of the above description refer to independent verification of a customer's intent and/or authorization to purchase goods and services, a system and method embodying the invention could be used to perform any type of independent third party verification. For instance, the system could be used to independently verify choices made by a voter, or responses to opinion polls. Thus, a system and method embodying the invention is not limited to simply verifying a customer's intent to enter into a contract.

The foregoing embodiments are merely exemplary and are not to be construed as limiting the present invention. The present teaching can be readily applied to other methods and other types of apparatus. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for performing independent verification, comprising:
   a) a processor;
   b) question generating unit, connected to the processor, configured to pose questions to a customer through a communications medium;
   c) a customer data interface for receiving customer-specific information, wherein the question generating unit is configured to generate at least one question based on customer-specific information received through the customer data interface;
   d) a response analysis unit, connected to the processor, configured to
      analyze customer responses to questions by performing speech recognition on spoken customer responses; and
      automatically generate an automated score for said customer responses;
   e) a recording unit configured to record customer responses to questions wherein the system is configured to simultaneously record a customer's spoken response and perform speech recognition on the spoken response to interpret the spoken response;
   f) an operator interface configured to allow an operator to review recorded customer responses; and
      input an operator score for a series of recorded customer responses; and
   g) a comparing unit for comparing an operator score of a series of customer responses to an automated score for the series of customer responses that was generated by die response analysis unit.

2. The system of claim 1, wherein the question generating unit comprises a speech synthesis unit.

3. The system of claim 1 wherein the question generating unit comprises an audio player for playing pre-recorded sounds.

4. The system of claim 1, wherein the system is configured to communicate with a customer over at least one communications medium selected from the group consisting of a telephone network, a local area computer network, a wide area computer network, a worldwide computer network, and a radio communications system.

5. The system of claim 4, wherein the response analysis unit is also configured to interpret DTMF tones.

6. The system of claim 4, wherein a customer response is given by pressing one or more keys on a computer keyboard, and wherein the response analysis unit is configured to determine what keys are pressed.

7. The system of claim 4, wherein a customer response is given by activating one or more buttons of a computer graphical pointing device, and wherein the response analysis unit is configured to interpret such responses.

8. The system of claim 1, wherein the system is configured to retrieve a series of customer responses that were recorded by the recording unit based on customer-specific information.

9. The system of claim 1, wherein the system is configured to re-create a series of questions posed to a customer, and the customer's responses to those questions, based on information recorded by the recording unit.

10. The system of claim 1, wherein the system is configured to generate a transcript of questions posed to a customer and the customer's responses to those questions, based, at least in part, on information stored by the recording unit.

11. A method of performing independent verification, comprising the steps of:
   a. posing a question to a customer with an automated question generating unit;
   b. recording a customer's spoken response to the question;
   c. analyzing the customer's spoken response to the question with a response analysis unit using speech recognition techniques, wherein the recording step and the analyzing step are performed simultaneously;
   d. automatically generating an automated score for a series of spoken customer responses based on said analyzing step;
   e. playing at least one recorded spoken customer response for a live operator;
   f. recording an operator score generated by the live operator based on the, at least, one recorded customer response;
   g. comparing, said operator score to said automated by a comparing unit score; and
   h. confirming the independent verification if the operator score corresponds with the automated score.

12. The method of claim 11 further comprising the step of at least one spoken customer response for further analysis if an operator score for the at least one spoken customer response does not match an automated score for the series of customer responses.

13. The method of claim 11, wherein step (a) comprises generating a question with a voice synthesis unit.

14. The method of claim 11, wherein step (a) comprises generating a question by playing pre-recorded sounds.

15. The method of claim 11, further comprising the step of receiving customer-specific information prior to performing step (a), and wherein step (a) comprises generating a question based on the received customer-specific information.

16. The method of claim 11, wherein step (c) comprises interpreting DTMF tones.

17. The method of claim 11, further comprising the steps of:
   a. determining whether to pose an additional question to the customer based on the results of the analyzing step; and
   b. repeating steps (a)–(b) if the result of step (a) is to pose an additional question.

18. A system for performing independent verification, comprising:
   a. a processor;
   b. question generating unit, connected to the processor, configured to pose questions to a customer through a communications medium;
   c. a response analysis unit, connected to the processor, configured to
      analyze customer responses to questions that the customer enters via a customer computer; and
      to automatically generate an automated score for a series of customer responses;
   d. a recording unit configured to record customer responses to questions; and
   e. an operator interface configured to allow an operator to review recorded customer responses; and
      input an operator score for a series of recorded customer responses; and
   f. a comparing unit for comparing an operator score of a series of customer responses to an automated score for the series of customer responses that was generated by the response analysis unit
      wherein said comparing unit confirms an independent verification if an operator score for a series of customer responses matches the automated score for the series of customer responses; and
      wherein said comparing unit flags a series of customer responses for further analysis if an operator score for the series of customer responses does not match an automated score for the series of customer responses.

19. The system of claim 18, wherein the question generating unit is configured to pose questions to a customer by causing the customer's computer to present the questions.

20. The system of claim 19, wherein the question generating unit is configured to pose questions to a customer by causing the customer's computer to display the questions on a display screen of the customer's computer.

21. The system of claim 19, wherein the question generating unit is configured to pose questions to a customer by causing the customer's computer to play the questions over speakers connected to the customer's computer.

22. The system of claim 18, wherein a computer response is given by pressing one or more keys of a keyboard of the customer's computer, and wherein the response analysis unit is configured to determine what keys are pressed.

23. The system of claim 18, wherein a customer response is given by activating one or more buttons of a graphical pointing device coupled to the customer's computer, and wherein the response the response analysis unit is configured to interpret such a response.

24. The system of claim 18, wherein if the comparing unit flags a series of customer responses for further analysis, the response analysis unit is configured to re-analyze the series of customer responses and to generate a new automated score, and wherein the comparing unit is configured to compare the new automated score to the operator score.

25. A method of performing independent verification, comprising the steps of:
   a. posing questions to a customer with an automated question generating unit by causing a customer's computer to display the questions;
   b. recording customer responses to the questions that the customer enters via the customer's computer;
   c. analyzing the customer responses to the questions that the customer enters via the customer's computer;
   d. generating an automated score for a series of spoken said customer responses;
   e. causing a live operator to review said customer responses;
   f. generating an operator score for the series of customer responses;
   g. comparing said operator score to said automated score, by a comparing unit
   h. confirming the independent verification if the operator score matches the automated score; and
   i. flagging said series of customer responses for further analysis if the operator score for the series does not match the automated score.

* * * * *